(12) United States Patent
Cheung

(10) Patent No.: US 7,062,709 B2
(45) Date of Patent: Jun. 13, 2006

(54) METHOD AND APPARATUS FOR CACHING VOICEXML DOCUMENTS

(75) Inventor: Daniel Lee Yuk Cheung, Basingstoke (GB)

(73) Assignee: International Business Machines Corporation, Armonk, NY (US)

(*) Notice: Subject to any disclaimer, the term of this patent is extended or adjusted under 35 U.S.C. 154(b) by 362 days.

(21) Appl. No.: 10/434,500

(22) Filed: May 8, 2003

(65) Prior Publication Data

US 2004/0123236 A1  Jun. 24, 2004

(30) Foreign Application Priority Data

Dec. 21, 2002 (GB) .............................. 0229892.5

(51) Int. Cl.
*G06F 17/00* (2006.01)
(52) U.S. Cl. .................................. 715/513; 715/500.1
(58) Field of Classification Search ................ 715/513, 715/500.1
See application file for complete search history.

(56) References Cited

U.S. PATENT DOCUMENTS 6,128,623 A * 10/2000 Mattis et al. ........... 707/103 R
6,249,844 B1 * 6/2001 Schloss et al. ............. 711/122
2002/0133627 A1 * 9/2002 Maes et al. ................ 709/246
2004/0049737 A1 * 3/2004 Hunt et al. ................. 715/513

OTHER PUBLICATIONS

Freire, J., et al., "Accessing Personalized Web Content and Services", Proceedings of the 10th international conference on World Wide Web, Hong Kong, published May 2001, pp. 576-586.*

* cited by examiner

*Primary Examiner*—William Bashore
*Assistant Examiner*—Amelia Rutledge
(74) *Attorney, Agent, or Firm*—Duke W. Yee; Herman Rodriquez; Brian D. Owens

(57) ABSTRACT

This invention relates to a method and apparatus in an interactive voice response system for caching VoiceXML documents. A method and system for processing a VoiceXML document prior to interpretation by a browser comprises: receiving a document from a web server; constructing a document object model (DOM) of the constituent parts of the document for interpretation by a browser; storing the DOM and the constituents parts in cache memory whereby next time the DOM and parts are required for interpretation it is retrieved from cache memory rather than constructed again from the source code. The constituent parts may be re-used in the or other documents. The constituent parts are separated into logic and data parts.

20 Claims, 4 Drawing Sheets

METHOD AND APPARATUS FOR CACHING VOICEXML DOCUMENTS

FIELD OF THE INVENTION

This invention relates to a method and apparatus for caching documents. In particular it relates to a method and apparatus in an interactive voice response system for caching VoiceXML documents.

BACKGROUND OF THE INVENTION

A typical business interaction between a user and a business agent involves the agent talking to the user, asking questions, entering responses into a computer, and reading information to the user from a terminal screen. Such an interaction can be used to place a catalogue order; check an airline schedule; query a price; review an account balance; notify a customer; record and retrieve a message. For logical processes this can be automated by substituting the agent for an interactive voice response system (IVR) with an ability to play voice prompts and receive user input by speech recognition or from DTMF tones.

An interactive voice response system is typically implemented using a client server configuration where the telephony interface and voice application run on the client machine and voice data supply server software such as text-to-speech or a voice prompt database runs on a server with a local area network connecting the two machines. When the voice application requires voice data it requests a voice server to start streaming the voice data to the client. The client waits until a certain amount of voice data has been accumulated in a buffer and then plays voice data on an open telephony channel.

Voice applications used in an IVR can be written in VoiceXML markup language. VoiceXML is industry standard in the telephony market and grew from extensible markup language (XML). Through the use of customised tags VoiceXML offers greater flexibility in organising and presenting information than is possible with other mark up coding systems. VoiceXML defines a new set of XML 'tags' which can be used to write voice response applications and it simplifies speech application development by using familiar web infrastructure, including web pages, web tools and web servers.

Voice applications in the form of web pages are fetched and interpreted by a VoiceXML enabled browser which invokes the actions defined in the web page by the VoiceXML tags, e.g. play prompt; get DTMF; do voice recognition; play text-to-speech string etc. This allows people to embed VoiceXML tags in their existing HTML pages and effectively have a single source for both text and telephony based interaction with a server side application. The pages are simply served up to an IVR from a standard web server using the HTTP protocol in the same way as HTML pages would be. VoiceXML components such as a voice prompts are embedded in the VoiceXML application.

In a typical interactive voice system, a cache of a VoiceXML source code comprises a hash table of Universal Resource Indicator (URI) keys and associated filename entries. These entries are references to local files that exist in a known directory on the local machine. Each time a request is made to the cache for a document, the local file is loaded, its input stream is read, objects are created for each and every element in the document and processed in a hierarchical fashion.

For voice systems that use VoiceXML documents to describe dialogues with callers and support multiple telephone channels, there is a need to be able to efficiently cache VoiceXML documents for reuse across calls and across channels. Ordinarily a VoiceXML browser reads a raw input stream from a file and a VoiceXML parser generates a complete in-memory tree representation of the VoiceXML document. A schematic representation of the initial steps involved in prior art Document Object Model (DOM) creation follows:

Initial: DOCUMENT -read->INPUT STREAM -parse->DOM

Therefore current implementations store the source form of the VoiceXML document and require the VoiceXML interpreter to re-parse the document before use on each and every call. The problem with this process is that it is slow and is repeated every time a document is loaded regardless of whether it has been previously loaded.

DISCLOSURE OF THE INVENTION

According to a first aspect of the present invention there is provided a method of processing a mark-up language document prior to interpretation by a browser: receiving a mark-up document from a remote server; constructing a hierarchical structure of the constituent parts of the document for interpretation by a browser; storing the hierarchical structure and the constituents parts in local memory whereby next time the constructed document structure and parts are required for interpretation it is retrieved from local memory rather than constructed again from the source code.

The document is suitably a VoiceXML document and the hierarchical and constituent parts are a document object model (DOM). For instance, in the VoiceXML embodiment, time is saved by caching the entire DOM structure. The first time a document is loaded, the DOM tree is constructed as before. At this time the DOM tree is stored in a cache so that the next time the document is required, the DOM object is retrieved directly from cache. A schematic representation of the steps involved in DOM creation follows:

Initial retrieval: DOCUMENT -request->CACHE -not present->INPUT STREAM -parse->DOM -put in cache->CACHE Subsequent retrieval: DOCUMENT -request->CACHE -present->DOM Such caching of the DOM cuts out the expensive overhead of parsing a VoiceXML document each time it needs to be loaded into memory. This method saves time in making a DOM tree available but it can take significant space when stored in cache. A VoiceXML application can be extremely big and storing a DOM object in cache would consume a large amount of memory resource. Multiple VoiceXML documents would consume even more memory and could reduce that memory available for processing.

Instead of caching the whole DOM tree, fragments of the structure may be cached. In this way the browser benefits from an improvement in processing time and a cache populated by reusable DOM fragments. The DOM tree can be constructed from these fragments because the attributes and text can be separated from VoiceXML logic (or instructions) and set later. A schematic representation of the steps involved in DOM creation with fragments follows:

Initial retrieval: DOCUMENT -request->CACHE -not present->INPUT STREAM -parse->DOM -fragment->DOM FRAGMENTS -put in cache->FRAGMENT CACHE Subsequent retrieval: DOCUMENT -request->CACHE -present->FRAGMENT CACHE -construct->DOM (NO ATTRS OR TEXT) -set attrs & text->DOM An object in a DOM is the smallest data in the DOM. A fragment is a collection of objects and in particular all objects at a particular processing level or level within the DOM hierarchy. Both objects and fragments are consituent parts.

Advantageously the step of storing the hierarchical structure and constituent parts comprises checking the local memory for any pre-stored parts which are the same as the constituent parts; and storing in local memory only those constituent parts having no pre-stored equivalent whereby local memory does not store replicas of parts and local memory resource is maximised. This allows common parts in the same document and in other documents to be shared in the local memory space. This saves on memory when there is much commonality in the document or documents.

Advantageously the method further comprises associating a part with a unique reference which identifies equivalent parts. This unique reference is a numeric key derived from the actual elements that form the constituent part.

Preferably each constituent part contains a suitably sized collection of objects within the document object model, after being received from the remote server as a stream the document is constructed into a document object model; this document model next has its constituent parts identified; local memory is checked for any pre-stored parts that comprise of constructed objects using a unique numeric key reference; those constructed objects which are not pre-existing in local memory, that is a unique numeric key reference did not score a cache hit are then stored in local memory. This allows different documents to have common parts.

All documents are composed of a subset of elements that are processed in a routine fashion. There are only ever two degrees of freedom. These are attributes and text. These data sets are stored in a separate cache with the URI as the key reference. When these are eventually added to our constructed freeform objects, they recreate the original DOM object. All objects will have attribute properties and string data that require initialisation. Advantageously these freeform objects will be initialised after the DOM tree has been assembled from its constituent parts by traversing the hierarchical tree of objects and setting their attributes and data accordingly.

In addition, an instruction set should detail how to build the original DOM tree from its constituent parts. The instruction set is stored in a separate cache, again with the URI as the key reference. Advantageously, the DOM tree is assembled in a hierarchical fashion whereby root node objects are created and referenced pre-stored parts are appended to these nodes much like calling subroutines in a program. Caching in this manner means that storage is kept to a minimum but runtime performance is maximised. It is entirely possible that two URI references could have exactly the same instruction sets so there is scope for duplication.

The above solution increases cache performance by storing the objects directly in cache and setting them during runtime. It also reduces object storage allocation by creating fragment instruction sets.

The prior art solution stores the document object and its constituent element objects directly in cache by making them serializable and cloneable. The above approach reduces time taken to create these objects and reduces the space they consume in the cache due to duplication by separating the data (attrs, text) from the logic (or instructions) and storing them as cacheable fragments which can be retrieved and set quickly and easily.

BRIEF DESCRIPTION OF THE DRAWINGS

In order to promote a fuller understanding of this and other aspects of the present invention, an embodiment of the invention will now be described, by means of example only, with reference to the accompanying drawings in which.

DESCRIPTION OF THE PREFERRED EMBODIMENTS

Figure 1:
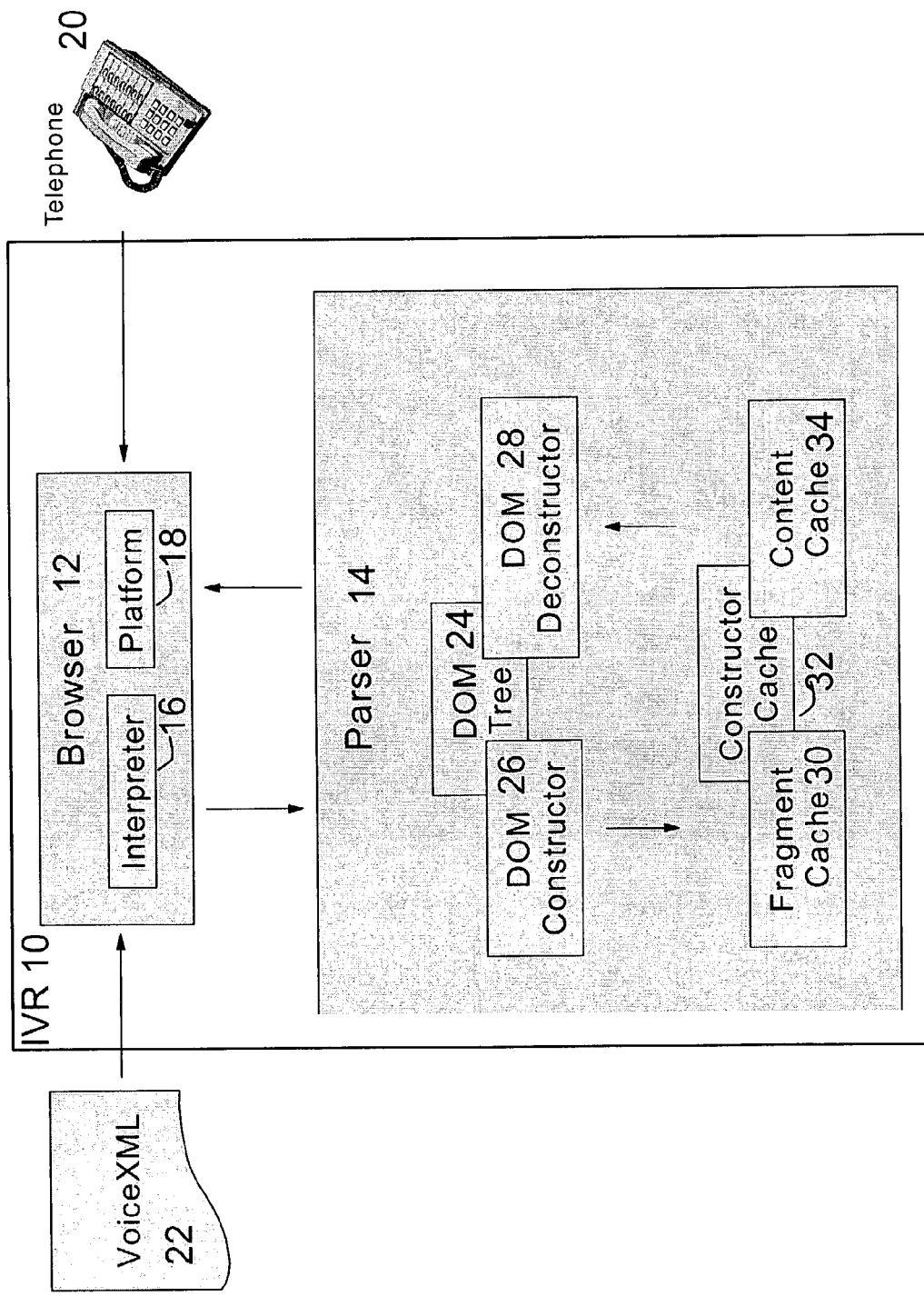
FIG. 1 is a schematic system overview.

Referring to the schematic overview of the present embodiment shown in FIG. 1. An interactive voice response (IVR) system 10 comprises a browser 12 and a parser 14. The browser 12 comprises an interpreter 16 and a platform 18. When the browser 12 is started after the IVR 10 connects with a telephone 20, it fetches the input stream from a VoiceXML document 22. Presently, this input stream is given to the parser 14 which in turn creates a Document Object Model (DOM) 24 which is a hierarchical tree representation of the VoiceXML document 22. The parser 14 traverses this tree and creates and initialises VoiceXML objects like an object factory. When a call comes in, these objects are executed to perform the appropriate telephony actions.

The parser 14 comprises: DOM tree 24; a DOM constructor 26; a DOM deconstructor 28; fragment cache 30; constructor cache 32; and content cache 34. Now, after the DOM tree has been constructed from document source code, it is deconstructed into fragment parts which can be used again. These fragment parts pertain to the hierarchical relationship that exist between the VoiceXML objects but are not initialised with content. The content is cached in the content cache 34; the instructions used to construct the original full tree is cached in the constructor cache 32. Each VoiceXML document 22 has a universal resource indicator (URI) for identification purposes. When the VoiceXML document 22 is loaded again, the browser uses its unique URI key to obtain the construction instructions for this document from the constructor cache 32. The DOM constructor 26 then rebuilds the tree of VoiceXML objects maintaining their hierarchical relationships. Next, these VoiceXML objects are initialised with the original content from the content cache 34. This content includes attributes and text. When a telephone call comes into the IVR 10 the objects are executed and performed just as if the DOM were assembled from scratch.

Figure 2:
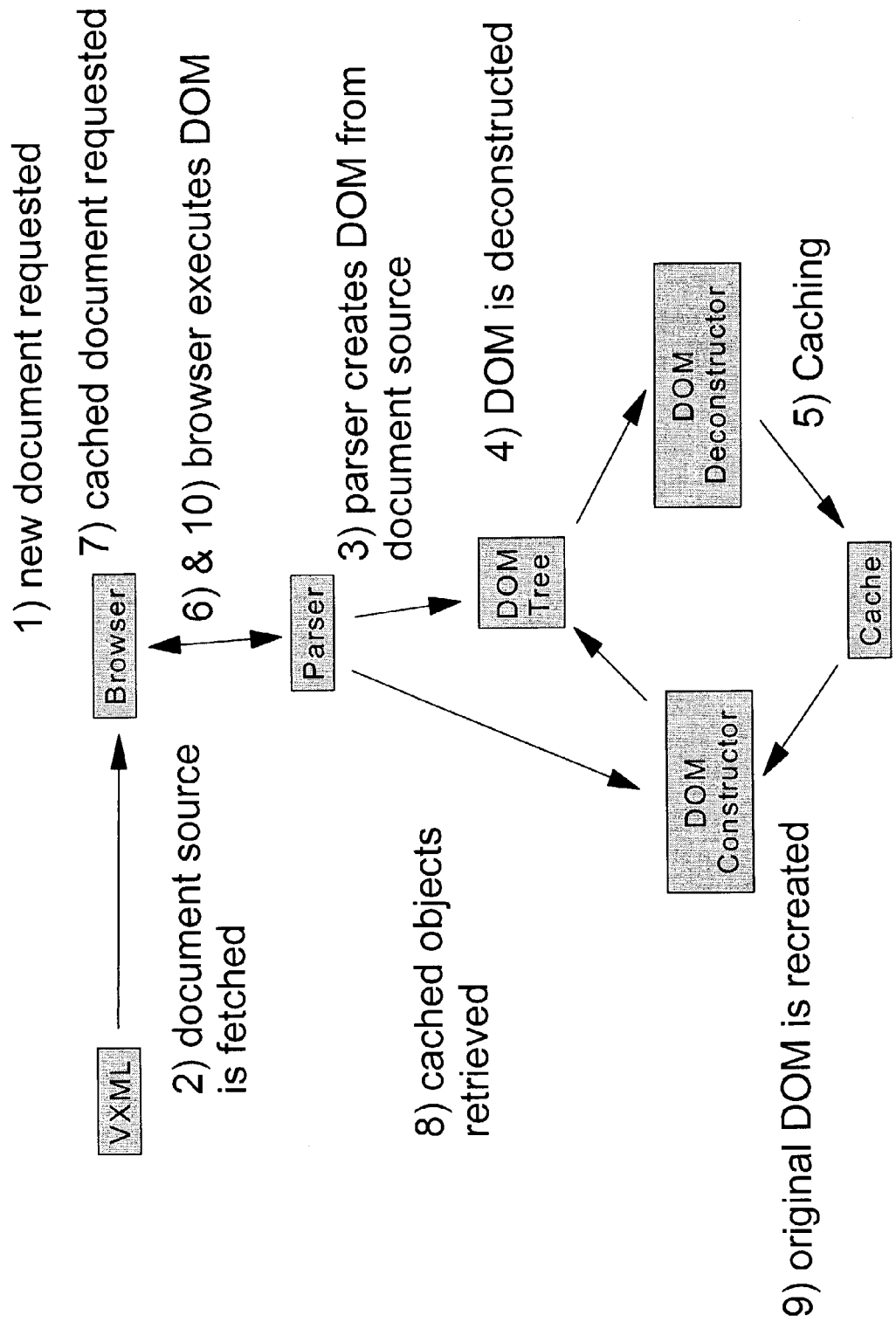
FIG. 2 is a schematic of the workflow through the system.

Referring to FIG. 2. The first pass through the browser 12 will be relatively slow as the DOM tree needs to be fetched, created and then deconstructed into fragment parts and stored (Steps 1 to 5). However, thereafter, the browser 12 can construct the tree from the cached information. This saves reading the input stream repeatedly (as in step 2) and creating VoiceXML objects (step 3) from scratch. The objects just require fetching (step 8) and initialisation (step 9) which is faster and more efficient than steps 1 to 5. The full sequence is described below:

step 1) a new document requested, the browser 12 requests a new VoiceXML document URI;

step 2) document source is fetched, input stream of the document source code is retrieved;

step 3) parser 14 creates DOM tree 24 from the document source, also the objects associated with each element of the DOM tree are created;

step 4) DOM is deconstructed into its fragment parts each of which contain their associated objects;

step 5) caching, fragment parts are cached, content (attributes and text) are cached, instructions for assembling are cached but parts which already exist in the cache are not cached again;

step 6) browser 12 executes the DOM, each object in the DOM which corresponds to a telephony action is executed;

step 7) a cached document is requested, the browser requests the cached VoiceXML document using the URI;

step 8) the cached objects are retrieved, the parser 14 retrieves the cached DOM constructor information for the document URI;

step 9) the DOM tree 24 is recreated from its constituent cached fragments and the original cached content is applied to their correctly associated objects; and step 10) browser 12 executes DOM tree 24, each object in the DOM tree 24 which corresponding to a telephony action is executed.

Figure 3:
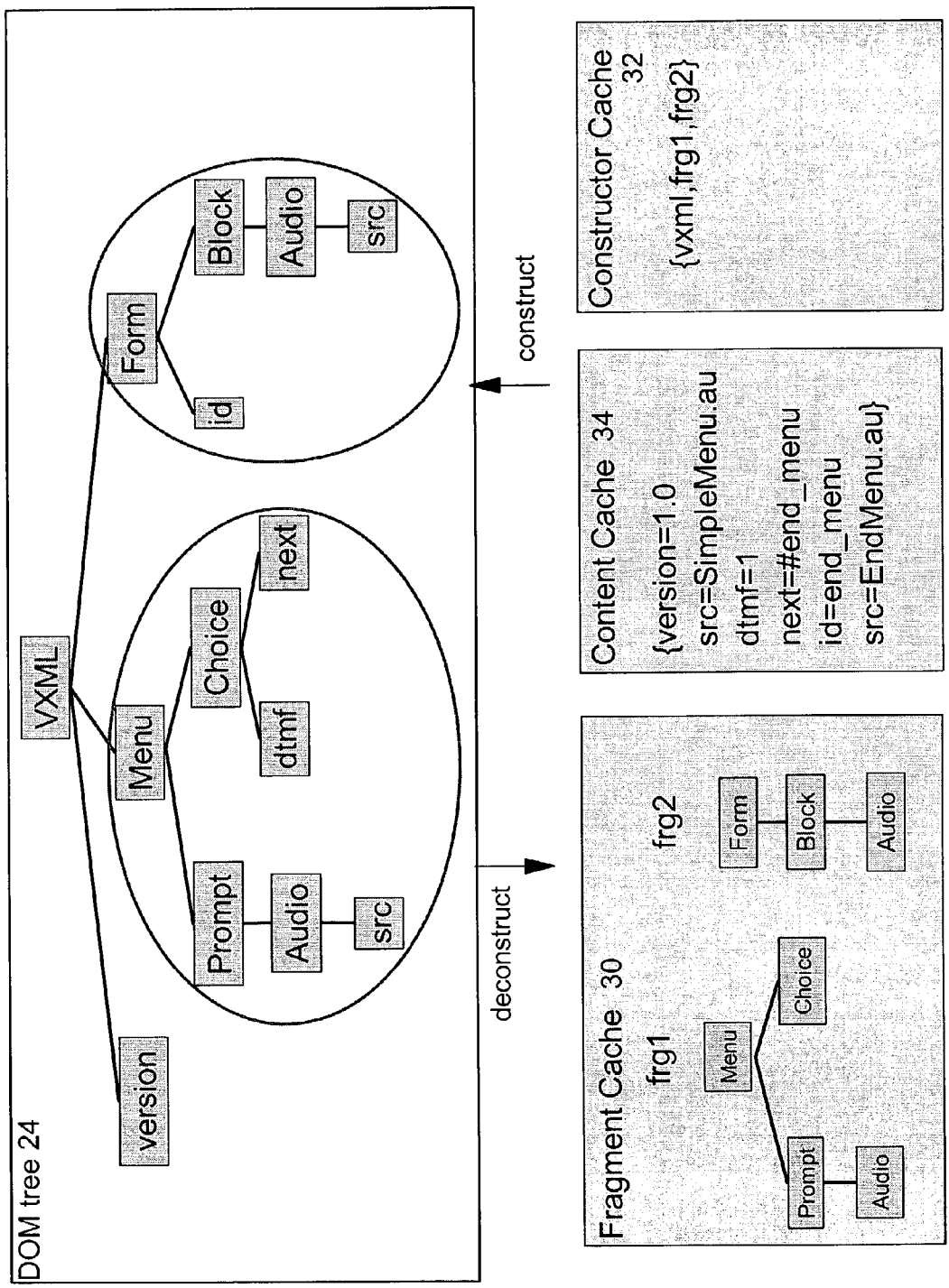
FIG. 3 shows a schematic of a construction and deconstruction process.

FIG. 3 shows the DOM tree 24 for an example VoiceXML document, SimpleMenu.vxml, the source code of which follows:

```
<vxml version="1.0">
    <!-- This simple menu does not require text to speech
    or voice recognition capabilities. It plays an audio
    file and recognises DTMF input. -->
    <menu>
        <prompt>
            <audio src="SimpleMenu.au" />
        </prompt>
        <choice dtmf="1" next="#end_menu" />
    </menu>
    <form id="end_menu">
        <block>
            <audio src="EndMenu.au" />
        </block>
    </form>
</vxml>
```

If we dissect the script, we have 1 attribute for <vxml> (that is 'version="1.0"'), 0 for menu, 0 for prompt, 1 for audio, etc. In this example there is no text for any elements. Vector translations are provided for both these data sets as follows:
attributes={1, version="1.0", 0, 0, 1, src="AnotherMenu.au", 2, dtmf="1", next="#end_menu", 1, id="end_menu", 0}
text={" ", " ", " ", " ", " ", " ", " ", " "}

The reusable DOM fragments for this script are generated by splitting the overall tree into its constituent element siblings and caching them.
frg1={prompt, audio}
frg2={block, audio}
frg3={menu, prompt, audio, choice}
frg4={form, block, audio}

The cache entry for SimpleMenu.vxml would be {frg3, frg4}. So the next time SimpleMenu.vxml is requested, a new Document instance is created along with the root element which is "vxml". The DOM fragments (frg3, frg4) are retrieved from the fragment cache and appended to the root element. Finally, the attributes and text strings are obtained from their corresponding caches and are applied to the tree by traversing it and making the changes.

The constructor cache 32 holds information on how to build the DOM tree 24 based on the document URI. In this case, the instructions are for creating a VoiceXML root element object (<vxml>) and attach fragment 1 (frg1) and fragment 2 (frg2) to this root element (<vxml>). The fragment cache 30 contains the skeleton VoiceXML objects (frg1 and frg2) and their relationships but not the content. Fragments 1 and 2 have unique URIs, are reusable within the same document or within multiple documents. The content cache 34 holds the attributes for each vxml element object. These are applied at the end of the process to complete the DOM tree.

Figure 4:
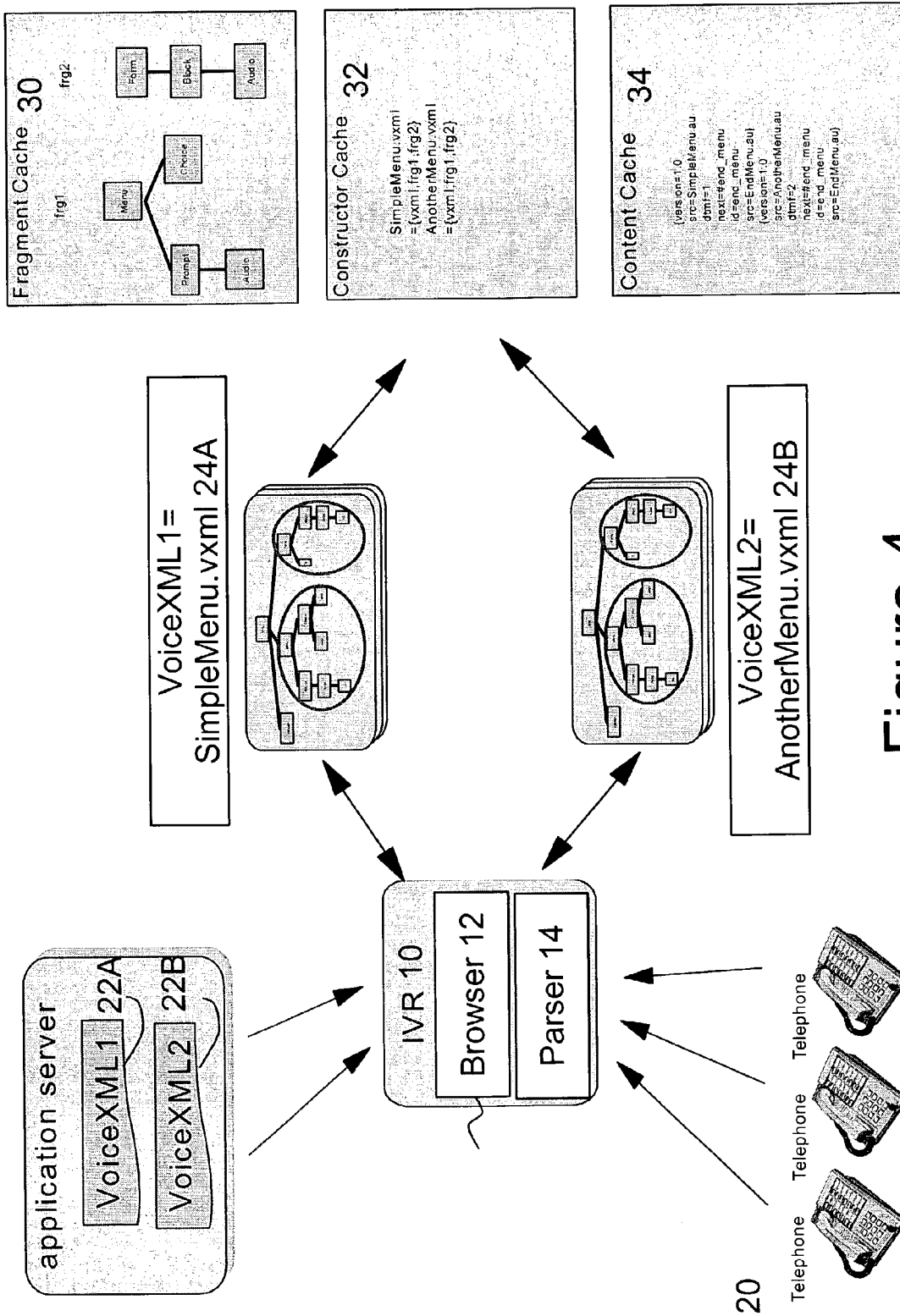
FIG. 4 is an example of the operation of the present embodiment with two documents.

Referring to FIG. 4 there is shown an example of the operation of the present embodiment for two similar VoiceXML applications. Consider two applications, SimpleMenu.vxml 22A and AnotherMenu.vxml 22B which are similar in structure but differ slightly in content. SimpleMenu.vxml refers to a different audio source in menu than AnotherMenu.vxml. AnotherMenu.vxml source code is shown below with the differences over SimpleMenu.vxml (shown above) underlined. IVR 10 loads SimpleMenu.vxml 22A first and parser 14 constructs DOM tree 24A and caches it. The second document, AnotherMenu.vxml 22B is then loaded. The DOM tree 24B of AnotherMenu.vxml is deconstructed by the parser 14 in the same way. Since it has the same VoiceXML structure to SimpleMenu.vxml, it will use the same fragments from fragment cache 30. However, it will store its own unique content separately in content cache 34 and its construction instructions in constructor cache 32. When multiple calls come in from telephones 20A, B, C they will request either SimpleMenu.vxml 22A or AnotherMenu.vxml 22B. The browser will now construct the DOM trees 24A and 24B from the cached information.

```
<vxml version="1.0">
    <!-- This menu does not require text to speech or voice
    recognition capabilities. It plays an audio file and
    recognises DTMF input. -->
    <menu>
        <prompt>
            <audio src="AnotherMenu.au" />
        </prompt>
        <choice dtmf="1" next="#end_menu" />
    </menu>
    <form id="end_menu">
        <block>
            <audio src="EndMenu.au" />
        </block>
    </form>
</vxml>
```

For a large VXML document, an algorithm identifies as many fragments as it can within a DOM tree and splits it up accordingly. Splitting the tree up this way means that more fragments are likely to be shared. Also, by using fragments we are able to control the size of the fragment cache because we can dispose of unused fragments quite readily without affecting large DOM tree structures. The larger the VXML document the more likely it is to contain similar fragments and multiple VXML documents will also share similar fragments so the potential savings to both memory consumption and processing time would be great.

What is claimed is:

1. A method of processing a voice mark-up language document prior to interpretation by a browser comprising:
    receiving a voice mark-up language document from a remote server;
    constructing a document object model of constituent parts of the voice mark-up document for interpretation by a browser;
    deconstructing the document object model in parts, wherein the parts comprise fragments, content, and constructors;
    caching the parts separately in local memory, wherein next time the parts are required for interpretation, the parts are retrieved from local memory rather than constructed again from source code;
    responsive to receiving a phone call, rebuilding the parts to reform the document object model by retrieving the parts cached in the local memory; and
    executing the document object model.

2. A method as in claim 1 wherein the parts are cached separately in a fragment cache, a constructor cache, and a content cache.

3. A method as in claim 1 wherein the step of caching the parts comprises checking the local memory for any pre-stored parts which are the same as the parts; and storing in local memory only those parts having no pre-stored equivalent whereby local memory does not store replicas of parts and local memory resource is maximized.

4. A method as in claim 1 further comprising associating a part with a unique reference which identifies equivalent parts.

5. A method as in claim 1 wherein the parts are further separated into logic parts and data parts.

6. The method of claim 1, wherein objects within the document object model correspond to a telephony action.

7. The method of claim 6, wherein the method is applied to a plurality of voice mark-up documents, wherein identical parts within the plurality of voice mark-up documents are not cached more than once for limiting memory consumption and processing time.

8. The method of claim 1, wherein the content includes the content of the document object model including attributes and text.

9. The method of claim 1, wherein the constructors include instructions for reconstructing the parts into the document object model.

10. The method of claim 1, wherein the fragments establish a hierarchical relationship between the parts.

11. The method of claim 1, wherein the voice mark-up language document has a universal resource indicator for identification purposes.

12. The method of claim 1, further comprising:
    responsive to the voice mark-up language document being requested, fetching the document source code of the voice mark-up language document; and
    retrieving the input stream of the document source code of the voice mark-up language document.

13. An interactive voice response system comprising:
    means for receiving a voice mark-up document from a remote server;
    a local memory,
        wherein a parser stored in the local memory is configured to construct a document object model of constituent parts of the voice mark-up document for interpretation by a browser, deconstruct the document object model into parts, wherein the parts comprise fragments, content, and constructors; and
    a cache for caching the parts separately in local memory whereby in response to receiving a phone call, the parts are retrieved and the parts are rebuilt to form the document object model from local memory rather than constructed again from source code.

14. A system as in claim 13 wherein the voice mark-up document is a VoiceXML document.

15. A system as in claim 13 wherein the cache is configured to check the local memory for any pre-stored parts which are the same as the parts, and store in local memory only those parts having no pre-stored equivalent whereby local memory does not store replicas of parts and local memory resource is maximized.

16. A system as in claim 13 further comprising associating a part with a unique reference which identifies equivalent parts.

17. A system as in claim 13 wherein the parts are further separated into logic parts and data parts.

18. A system as in claim 13, comprising:
    a browser stored within the local memory configured to execute the document object model rebuilt from the parts cached in the cache for purposes of efficiency.

19. A computer program product for processing one or more sets of data processing tasks, said computer program product comprising computer program instructions stored on a computer-readable storage medium including:
    computer usable program code for receiving a voice mark-up document from a remote server;
    computer usable program code for constructing a document object model of constituent parts of the voice mark-up document for interpretation by a browser;
    computer usable program code for deconstructing the document object model in parts, wherein the parts comprise fragments, content, and constructors;
    computer usable program code for caching the parts separately in local memory, wherein next time the parts are required for interpretation, the parts are retrieved from local memory, rather than constructed again from source code;
    computer usable program code responsive to receiving a phone call, for rebuilding the parts to reform the document object model by retrieving the parts from a cache; and
    computer usable program code for executing the document object model.

20. The computer program product of claim 9, further comprising:
    computer usable instructions responsive to the voice mark-up language document being requested, for fetching the document source code of the voice mark-up language document; and
    computer usable instructions for retrieving the input stream of the document source code of the voice mark-up language document.

* * * * *